United States Patent [19]

Wells

[11] Patent Number: 5,022,987
[45] Date of Patent: Jun. 11, 1991

[54] APPARATUS AND METHOD FOR SEPARATING AND REMOVAL OF FLOATING POLLUTANTS FROM A WATER SURFACE

[76] Inventor: Robert C. Wells, P.O. Box 984, Casa Grande, Ariz. 85222

[21] Appl. No.: 532,814

[22] Filed: Jun. 4, 1990

[51] Int. Cl.$^5$ ............................................. E02B 15/04
[52] U.S. Cl. ................................. 210/173; 210/242.3; 210/923; 114/61; 440/5; 440/6; 440/61; 440/113
[58] Field of Search ...................... 210/242.3, 923, 173, 210/776; 114/61; 440/5, 6, 61, 113

[56] References Cited

U.S. PATENT DOCUMENTS

| | | | |
|---|---|---|---|
| 3,659,713 | 5/1972 | Mueller | 210/242.3 |
| 3,664,505 | 5/1972 | Brittingham | 210/242.3 |
| 3,823,828 | 7/1974 | Derzhovets et al. | 210/242.3 |
| 3,847,815 | 11/1974 | Chastan-Bagnis | 210/923 |
| 3,860,519 | 1/1975 | Wentherford | 210/242.3 |
| 3,951,810 | 4/1976 | Crisafulli | 210/242.3 |
| 3,966,614 | 6/1976 | Ayers | 210/242.3 |
| 3,966,615 | 6/1970 | Petchal et al. | 210/923 |
| 4,033,869 | 7/1977 | McGrew | 210/923 |
| 4,033,876 | 7/1977 | Cojin et al. | 210/923 |
| 4,056,472 | 11/1977 | Teasdale | 210/242.3 |
| 4,111,811 | 5/1978 | Fukuda et al. | 210/242.3 |
| 4,265,757 | 5/1981 | Ivanoff | 210/242.3 |
| 4,356,086 | 10/1982 | Öberg | 210/242.3 |
| 4,372,854 | 2/1983 | Szereday | 210/242.3 |
| 4,487,694 | 12/1984 | Brandt et al. | 210/242.3 |
| 4,673,497 | 6/1987 | Lundin | 210/242.3 |
| 4,851,133 | 7/1989 | Rymal | 210/242.3 |
| 4,921,605 | 5/1990 | Chastan-Bagnis et al. | 210/242.3 |

*Primary Examiner*—Stanley Silverman
*Assistant Examiner*—Christopher Upton
*Attorney, Agent, or Firm*—Gregory J. Nelson

[57] ABSTRACT

A skimmer craft for removal of a layer of oil or other floating pollutants from the surface of a body of water including a pair of spaced-apart pontoons with a horizontal floor plate extending between the pontoons. A sump box is positioned at the rear of the skimmer plate or floor and defines a fixed water exit with the sump. The floor and sump are vertically adjustable as a unit. The sump box has a horizontally-extending weir through which oil may enter into the sump. The sump includes a comminutor unit which will reduce and break-up agglomerations in the oil. Propulsion units are positioned along the sides of the pontoons and at the bow and stern of the vessel at predetermined locations. The propulsion units may be selectively operated to establish a controlled flow pattern to direct water and the associated oil layer into the floatation pool where the oil layer is skimmed off and directed into the sump. The propulsion units are also operable to pilot the craft.

13 Claims, 4 Drawing Sheets

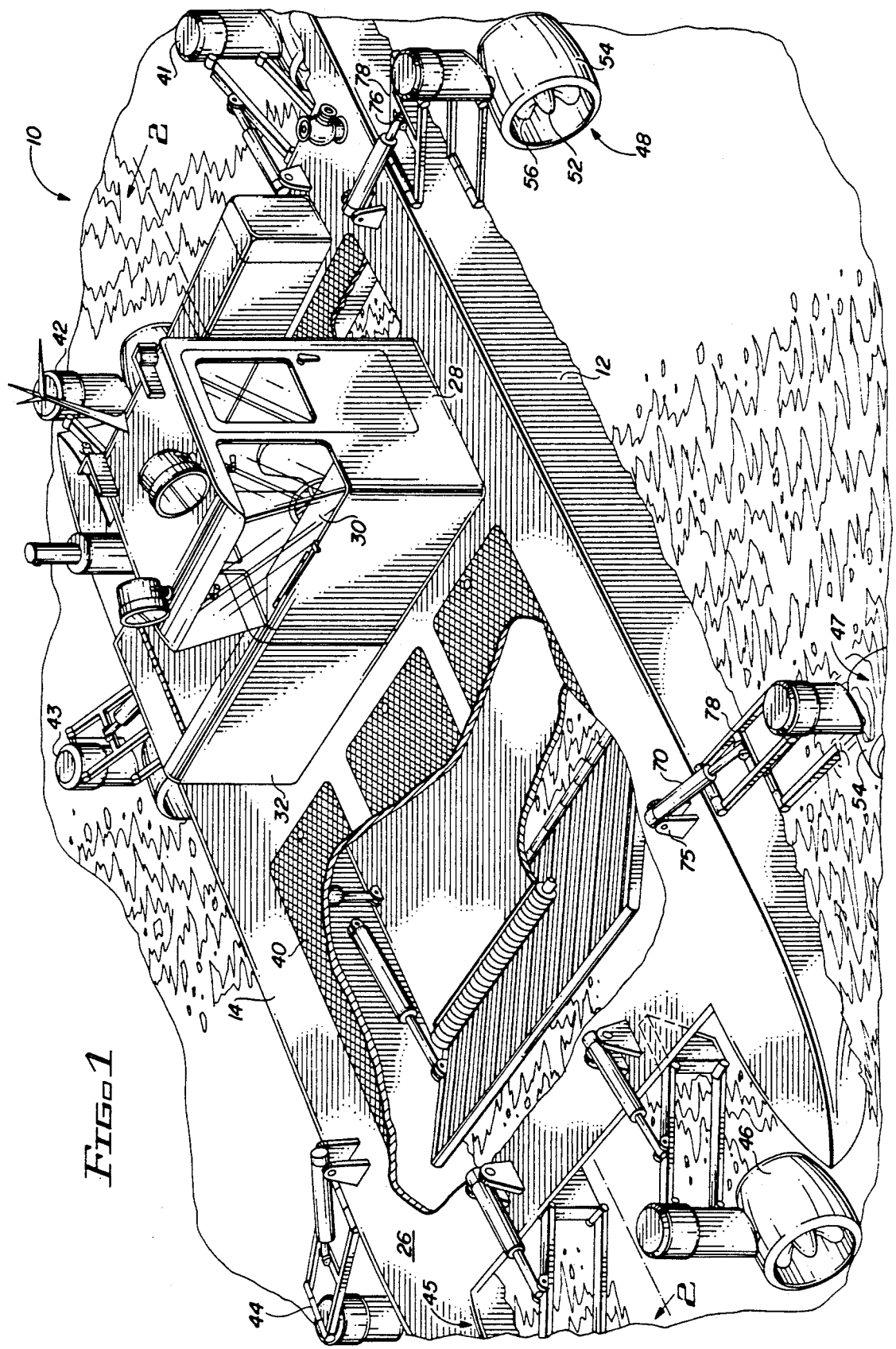

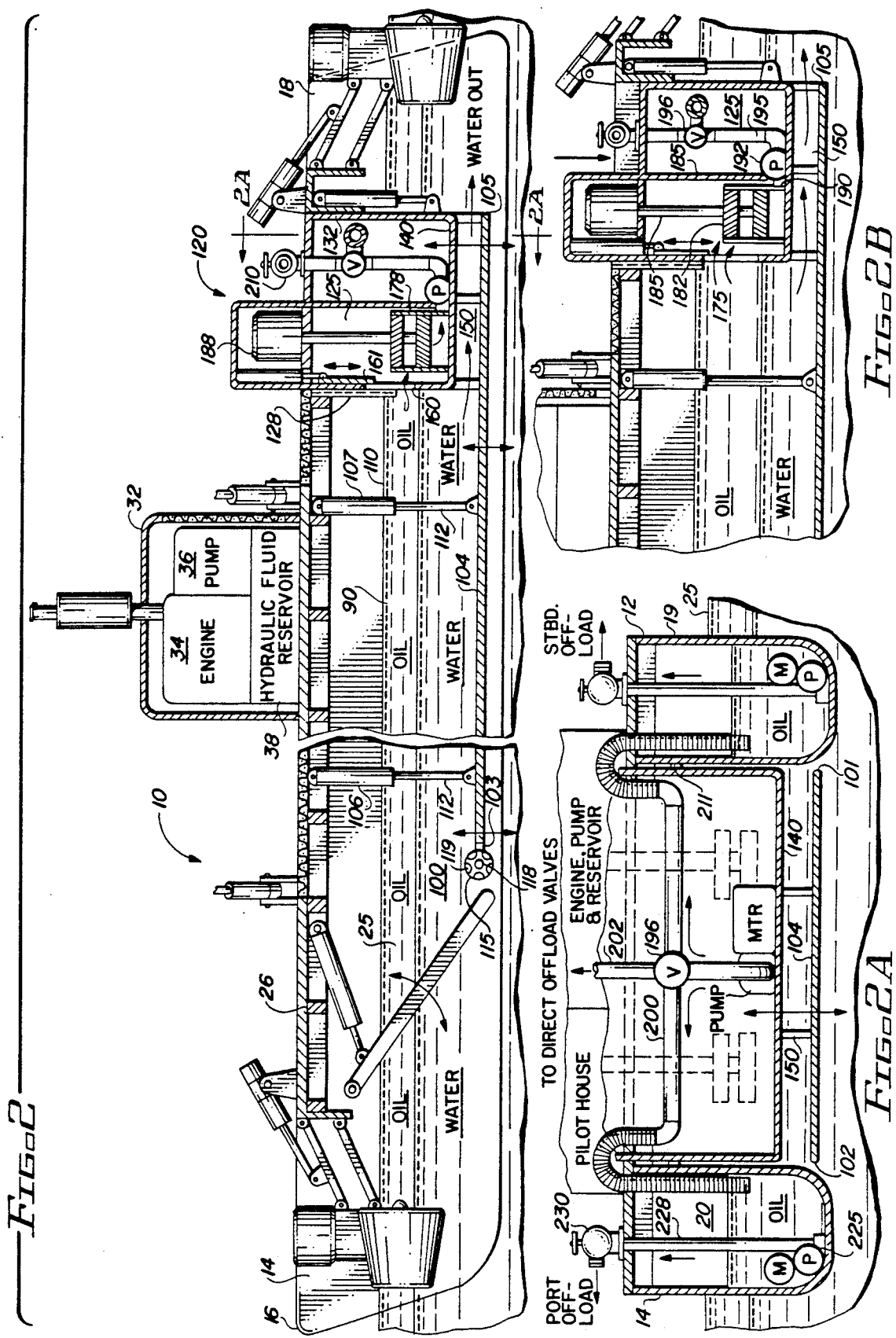

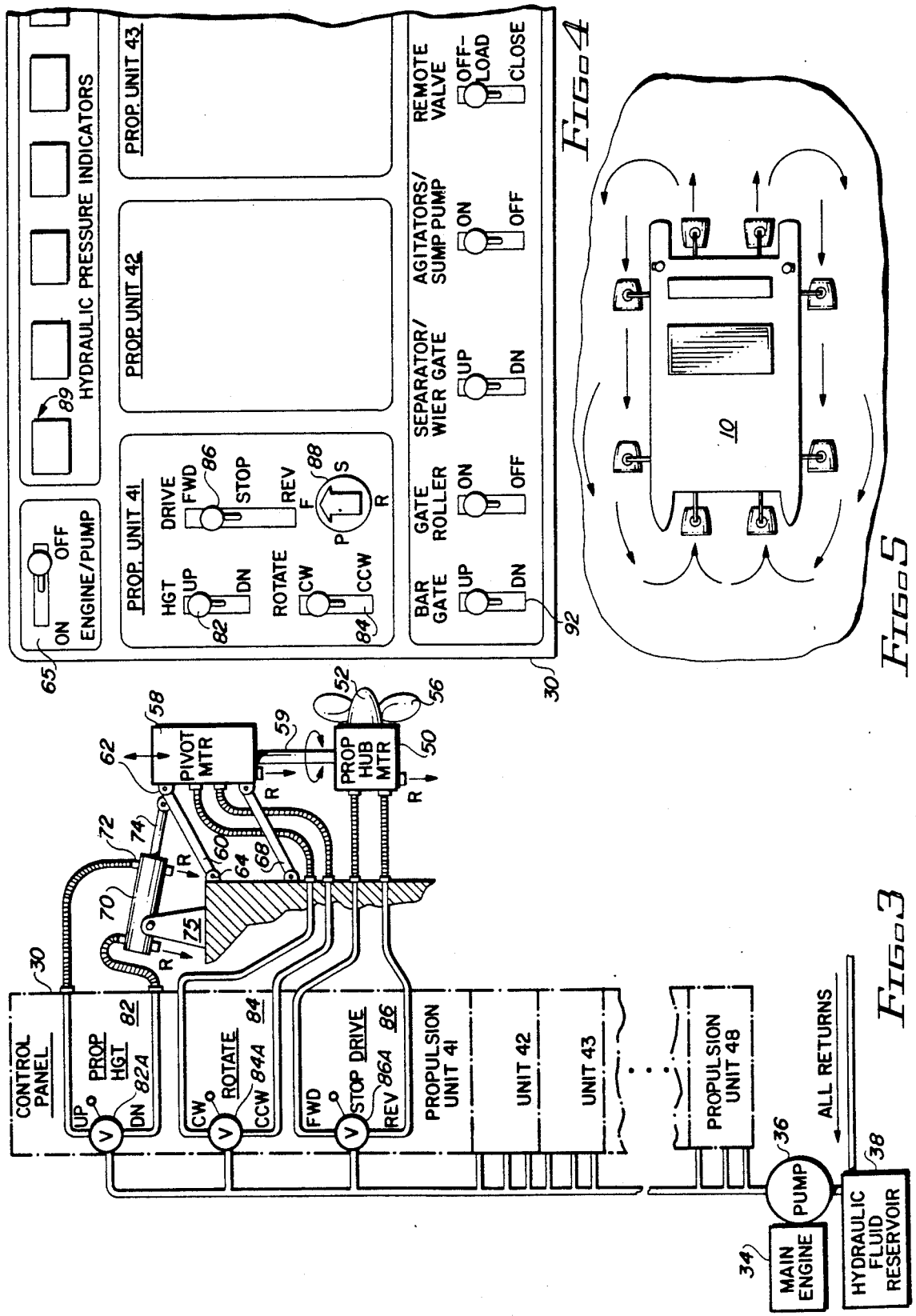

APPARATUS AND METHOD FOR SEPARATING AND REMOVAL OF FLOATING POLLUTANTS FROM A WATER SURFACE

The present invention relates to liquid separators and more particularly to an apparatus and method for removing pollutants such as a floating layer of liquid hydrocarbons from a body of water using a skimmer craft.

Recent oil spills on coastal waters and harbors such as the spill in Prince William Sound have dramatically emphasized the need for effective and efficient means for removing oil and other pollutants from the surface of a body of water. It is ecologically imperative that oil spills resulting from burst oil pipe lines or damaged tankers be quickly removed to prevent the oil from contaminating coastal areas and destroying marine life, wildlife and vegetation.

Various apparatus and techniques can be found in the prior art for the confinement and recovery of oil from such spills. One type of recovery apparatus employs absorption techniques. Absorbative materials, either free-floating or mounted on some type of collection apparatus such as rollers, are brought into contact with the oil. In the case of flotation absorption, a conveyor belt often picks up the oil-absorbing material and carries it to a compressor to squeeze out the oil from the material. While this method is effective to a degree, it has certain advantages and disadvantages in that large volumes or quantities of the absorbative material are required. Further, the distribution and collection of the absorbant material is labor and equipment intensive. The so-called sorbent booms have similar disadvantages.

Another approach to the problem of recovery of oil is the provision of suction or skimming devices which are employed to suck or skim off the oil from the surface of the water. For example, U.S. Pat. No. 4,111,811 shows an apparatus for collecting effluent which has a pair of forwardly opening side plates with an attached weir which is inclined rearwardly and downwardly. A slant plate is disposed behind the weir plate. Oil is collected into an oil pool that is fluidized by water jets and is condensed into a thick layer and enters into an intake port where it is pumped to a vessel. Sea water in the lower layer discharges externally through the water discharge port.

U.S. Pat. No. 4,056,472 shows an oil recovery apparatus in which oil to be recovered is passed over the weir edge of an oil skimmer mounted transversely across a flotation platform. Oil passing over the weir is sucked through a slotted flow equalizing baffle and removed to a collection vessel.

U.S. Pat. No. 4,372,854 discloses a device for removing floating liquid impurities such as oil from the water surface utilizing a suction effect to locally lower the water level to effect separation.

U.S. Pat. No. 3,951,810 shows an oil skimmer for removal of a layer of oil and other floating pollutants from the surface of a body of water. The skimmer has a sump box with a pump for conveying material from the sump box to an adjacent floating barge or vessel. A free-floating weir is disposed forwardly of the sump.

U.S. Pat. No. 3,966,615 shows a barge unit which collects and then contains and concentrates oil spills from the surface of a body of water. This is achieved by a flow of oil to water relative to the channel which has an adjustable water intake funnel at the forward end, an oil blockage wall at the rear end and an adjustable flow splitter at the rear. A water vent is provided at the bottom of the vessel for discharging water from the separating channel in a controlled manner. When the oil reaches the rear of the channel it is trapped and may either spill or overflow into an adjacent holding tank or may be pumped by a floating suction valve to a holding tank.

U.S. Pat. No. 3,670,896 discloses an apparatus and method for removing liquid hydrocarbon material such as oil from a water surface. The apparatus has a collection surface which is moved in and out of the water and which is made of a material of higher molecular weight which is wettable so that when the collection surface emerges from the water, the oil collected by absorption is wiped from the surface and transported to a suitable reservoir.

U.S. Pat. No. 3,823,828 shows a self-propelled oil skimmer craft having a collection tank with a water jet. The intake of the water jet is located below the inlet of the collection tank in the skimmer craft so that the flow is divided into two streams, one of which is a surface layer which contains the floating impurities and which enters the collection receptacle and the other underlying layer of water. The underlying layer of water enters a duct for delivery to the water jet and which jet also serves to draw the surface layer of the water and impurities towards the collection tank.

U.S. Pat. No. 4,265,757 discloses an oil skimmer barge with an inlet in the bow section communicating with a tank in the vessel. In accordance with the invention, one or more vanes are provided above the inlet in the bow to break up and reduce splashes of oil and water that tend to occur when the vessel is pitching in rough water. As the oil reaches the inlet opening, it flows into a holding tank in the barge from where it may be removed.

U.S. Pat. No. 3,664,505 discloses a floating collection apparatus for skimming oil slicks from a body of water. The oil and water is subjected to pressure generated by the weight and movement of the apparatus which tends to separate the oil from the water under pressure to force it to move into riser chambers in the vessel.

The present invention relates to an improved oil collection and skimmer water craft for use in cleaning large spills in a rapid and efficient manner. The device provides significant advantages over the prior art skimmers and collection devices and is highly maneuverable, even in rough water, establishing a controlled collection pattern which will serve to direct and collect oil from areas adjacent the craft well beyond the physical boundaries of the craft. The skimmer serves to isolate and separate a surface quantity of water with an oil layer so that the oil layer may be skimmed into a sump. The present invention can be used to "scrub" beach areas by operating in a moored or hovering position off the beach. As a result of the versatility and capability of the present invention, collection and removal of the oil layer is more efficient. One particularly significant feature is that the invention uses the water as a carrier to transport the attendent oil layer to a pool where the oil may be easily skimmed.

Briefly, the present invention includes a powerdriven craft having a skimmer assembly which is mounted between spaced-apart pontoons. A horizontal floor extends between the pontoons below the water surface and is vertically adjustable by means of hydraulic cylinders or similar devices. The pontoons each define holding tanks for containment of collected oil. The forward end of the floor carries a self-powered roller which serves to deflect any debris entering the skimmer area. A sump with a horizontally extending spill board defining a weir is located at the rear portion of the craft above the floor plate and defines a flotation pool along with the spill board and pontoons. The sump includes a comminutor through which the skimmed oil passes which comminutor serves to break-up lumps and debris in the oil. The oil on the surface of the water isolated in the flotation pool is skimmed at the weir and directed to the sump and comminutor from where it is pumped to holding tanks in the pontoons or directly to an adjacent support vessel. Water is discharged from the flotation pool at a water discharge passage below the sump and above the horizontal floor. The pilot house, controls, pump, power units and other support equipment are carried on the deck which extends between the pontoons.

Multiple, adjustable propulsion units are positioned forward and aft and at the sides of the craft as well as at the bow and stern. The propulsion units are preferably adjustable both as to depth and angularity and serve to induce a flow pattern about the device which directs flow from the rear of the skimmer forwardly along the sides of the pontoons and back to the front of the skimmer craft forward of the skimmer plate. The propulsion units may be propeller units or water jet units. The aft and stern propulsion units also serve as drive units to propel and maneuver the device to transport the device to an oil spill area. In the oil collection mode, the propulsion units may be operated to control and position the device in a stationary position as when a beach area is scrubbed or when several skimmer crafts are working in tandem. The term "oil" is used throughout to refer to a pollutant and is intended to include not only oil but all pollutants which will float on a water surface such as chemicals and the like.

The above and other objects and advantages of the present invention will become more apparent from the following description taken in conjunction with the drawings in which:

FIG. 1 is a perspective view of the oil skimmer craft of the present invention shown in an operating environment;

FIG. 2 is a sectional view taken along line 2—2 of FIG. 1;

FIG. 2A is a sectional view taken along line 2A—2A of FIG. 2;

FIG. 2B is a partial sectional view showing the rear of the skimmer plate and sump area;

FIG. 3 is a schematic view of the control systems for operating the propulsion units;

FIG. 4 is a plan view of a portion of the control panel of the skimmer craft of the present invention;

FIG. 5 is a plan view of the skimmer craft in an operating condition illustrating the typical flow path established by the propulsion units.

Figure 6:
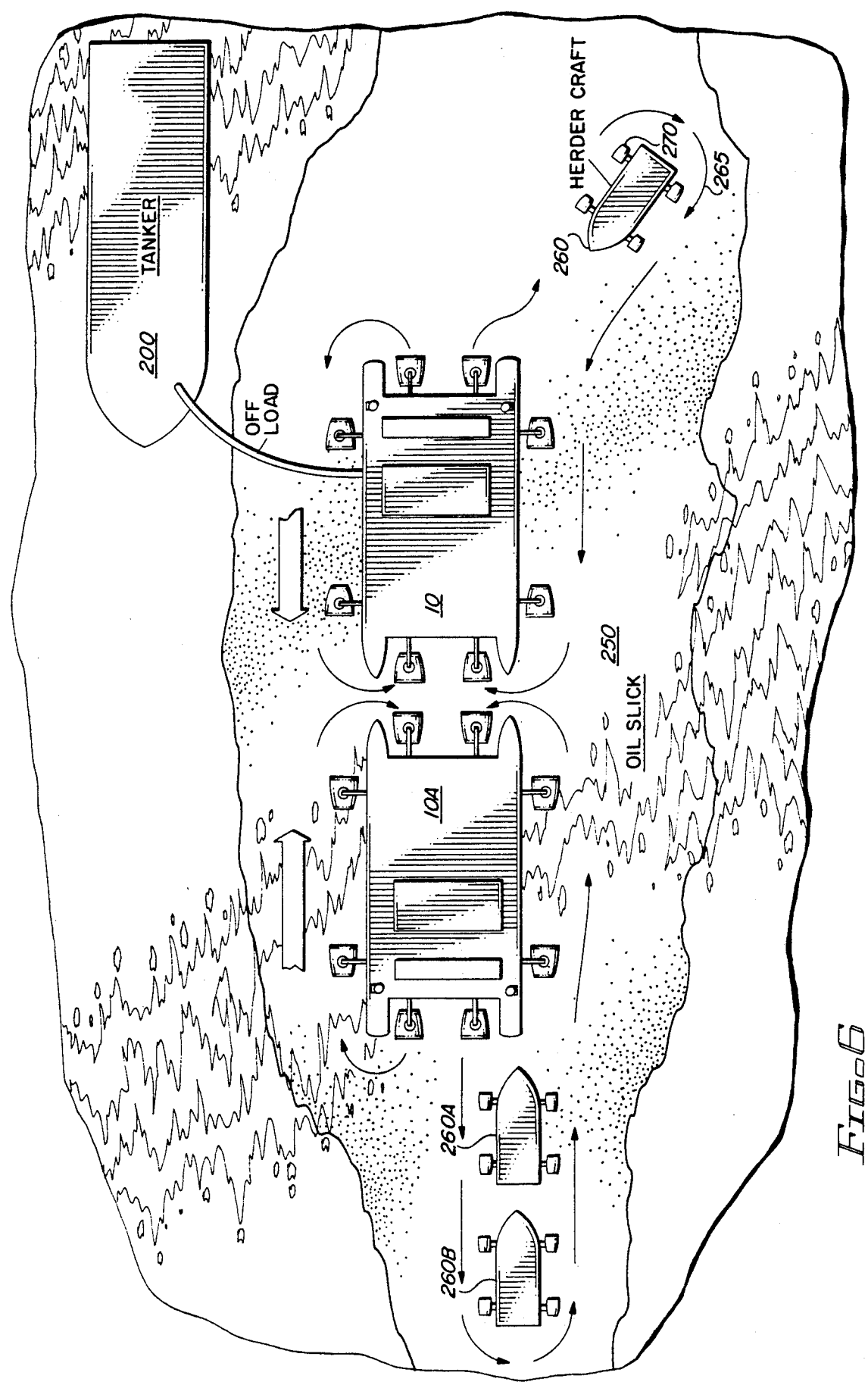
FIG. 6 is a plan view showing several skimmers operating in tandem with support vessels.

Referring now to the drawings, particularly FIGS. 1 and 2, the skimmer vessel of the present invention is generally designated by the reference numeral 10. The skimmer vessel includes a pair of generally elongate pontoons designated as the port pontoon 12 and the starboard pontoon 14. The hull of each of the pontoons are generally U-shaped in cross section having a bow portion 16 and a stern section 18. The hull of the pontoons each have deep generally vertical side walls 19 which extend a substantial depth below the water surface 25 and each is generally shown as being hollow each defining an interior chamber 20 which may receive ballast or may be used as storage tanks for recovered oil.

A generally horizontal deck 26 extends between the pontoons and supports a pilot's cabin 28 from which the pilot can control the operation of the skimmer at control panel 30 as shown in FIG. 4. The deck also supports a housing 32 which contains the marine engine 34 which powers pump 36 which supplies fluid pressure from hydraulic reservoir 38 to the various hydraulic components of the skimmer as will be explained. Cover plates 40 are variously positioned on the deck and may be selectively removed for access to the areas below the deck. The deck may secure other accessories and support equipment. In larger skimmer crafts, crew quarters and the like may be provided.

The skimmer 10 carries a number of propulsion units 41 to 48. The propulsion units serve to propel and steer the skimmer craft and also serve the important function of establishing a predetermined flow path in the body of water adjacent and below the skimmer craft to transport the oil to an area known as the flotation pool within the craft where it is collected. Two of the individual propulsion units 45 and 46 are shown as mounted inside and adjacent the bow of the pontoons at a location adjacent the longitudinal center line to induce a flow path along the center of the craft. Propulsion units 41 and 42 are mounted inside and adjacent the stern of the pontoons. Two additional propulsion units 47 and 48 are mounted outboard along the port side of the craft and two propulsion units 43 and 44 along the starboard side of the skimmer craft. This arrangement for the propulsion units is generally preferred although some variation of the location and number of the propulsion units may be necessary depending upon the size and shape of the skimmer craft.

Referring to FIGS. 1, 3 and 4, each of the propulsion units 41 to 48 is adjustably mounted with respect to the skimmer craft having drive unit 50 which, for example, may be an electric motor, or as shown, a hydraulic motor operatively connected to the hydraulic pump 36. The details of the hydraulic system are well known to those in the art and accordingly some details have been omitted for purposes of clarity. Each drive unit 50 has an axially extending drive shaft terminating at a hub 52 within propeller housing 54 which houses propeller 56. Drive 50 serves to reversely drive propeller 56 and as seen in FIGS. 3 and 4, which are representative of all drive units, is controlled by a control member 86 which operates to selectively direct hydraulic fluid to the motor 50 across a valve 56A. Typically the hydraulic motor 50 will be a vane or gear type unit.

Housing 54 is rotatively supported from pivot motor 58 at shaft 59. An upper pair of arms 60 are pivotally secured to the pivot motor 58 at pivot connections 62 having their opposite ends hinged to the pontoons or deck at pivot connections 64. A second pair of arms 68 pivotally extend between the housing and the drive unit 50 forming a parallel linkage so that the individual propulsion units under pilot control may be raised and lowered by means of hydraulic cylinders 70. The hydraulic cylinders 70 have a housing 72 and an extensible rod 74. The housing 72 is pivotally connected to the deck of the craft adjacent the propulsion units by clevis member 75. The outer end of the rod 74 is connected by a clevis 76 to a cross member 78 extending between the upper support arms 60. The various return hydraulic connections are indicated by the letter "R".

The propeller housings 54 are rotatively supported on the individual pivot motor housings 58 by shaft 59 extending therebetween. Drive shaft 59 is driven by motor 58 which may be a rotary hydraulic cylinder operatively controlled at 84 to selectively adjust the angular position of the propulsion unit. The depth of the propulsion unit is operatively controlled at control member 82 which selectively directs hydraulic fluid to cylinder 70.

Each of the propulsion units is controllable from control panel 28 as best seen in FIG. 4. The main engine 34 is started and stopped at switch 65. Each of the propulsion units may be lowered or raised by means of control member 82. Similarly, the direction of rotation of propeller 56 in each of the units is controllable at control member 84. The speed of the propulsion units is controlled at 86 and the position of the propulsion units is controllable at switch 88. Individual guages 89 are provided to indicate fluid pressure at each hydraulic motor. As will be explained in greater detail hereafter, by selective operation of the propulsion units, the craft can be precisely controlled even in rough seas. Further, the propulsion units will serve to establish a controlled and controllable flow pattern in the area around the skimmer craft to convey the oil to the flotation pool. Various other controls operating various valves, pumps and the like are provided at panel section 92 and are appropriately labeled.

The oil film or layer 90 on the water surface 25 is directed by the motion of the skimmer craft and by the induced flow pattern into the forward area between the pontoons which generally defines a flotation pool 100. The flotation pool extends from the bow of the pontoons to a location rearward of the cabin as seen in FIG. 2. Typically the oil layer 90 from an oil spill may be up to several inches thick floating on the top of the water and in FIG. 2 is shown in exaggerated thickness for clarity. A floor, or at least a partial floor plate 104, extends generally horizontally across the flotation pool. The floor has opposite side edges 101, 102 which terminate closely adjacent the inner sidewalls of the pontoon hulls. The forward edge 103 of the floor plate is located rearward of the bow and the rear edge 105 of the floor is inward of the stern. The floor is supported by vertically extending hydraulic cylinders 106 and 107. Each of the cylinders has a housing 110 pivotally secured to the underside of the deck. The rod 112 of each of the cylinders has its outer end pivotally secured at a clevis to the floor plate 104. In this way, the floor may be selectively raised or lowered under operator control.

The forward edge 103 of the floor terminates at a location rearward of the bow of the pontoons. In order to keep the forward edge of the floor free of debris, a roller 115 extends transversely along the forward edge of the floor being rotatively mounted to the floor plate at opposite ends at stub shafts 118. The roller is self-propelled having oppositely disposed and oppositely oriented cups 119 against which the flow of water will impact to rotate the roller.

A sump box 120 is supported above the rear of floor 104. The sump box 120 has front spill box wall 128, rear wall 132, side walls 134, 136 and floor 140. The floor 140 of the sump box is elevated above the floor of the flotation pool creating a flow or discharge channel 150 of predetermined size at the rear of the floor 100. The front or spill board wall of the sump box defines a transversely extending opening or wier 160 which communicates with the interior chamber 125 of the sump. The weir 160 is normally located at a position between the normal water levels to cause the oil layer and perhaps some water to be skimmed from the water. As best seen in FIG. 2B, the weir may be incorporated as a slot in a moveable plate 161 so the elevation of the opening to the sump chamber 125 may be adjusted.

The sump chamber 125 receives the skimmed oil and serves as a reservoir for the skimmed oil. One or more comminutor units 175 are positioned within the sump box. The comminutor units each include a generally cylindrical housing 178 upwardly extending from the floor of the sump having an upper edge below the level of the weir so that oil within the reservoir will flow into the comminutor housing. One or more cutters 182 are positioned within the housing and is shown having an auger-like configuration with several flights in close relationship with the interior diameter of the housing. Alternatively, sharp blades will work for this purposes. The comminutor is driven by a vertical shaft 185 by means of a drive motor 188 which may be hydraulic or electric. An outlet 190 is provided at the lower end of the comminutor housing below the cutter unit. The comminutor outlet 190 is connected to the inlet of pump 192. Pump 192 discharges via discharge line 195 across valve 196. The opposite outlets of valve 196 are connected to lines 200 which will selectively direct oil into the pontoons. The other outlet 202 of valve 196 is connected to valve 210 which is an off-load valve. Suitable flexible conduit or hose can be connected to this valve and oil can be pumped to an adjacent support tanker. The purpose of the comminutor is to break up any clumps or debris that may occur in the oil prior to the collected oil entering the pump. An oil water separator may be connected in the off-loading circuit to remove any carry-over water.

It is noted that the position of the floor plate 104 and sump 120 is adjustable relative to the pontoons and the deck of the skimmer. Accordingly, rubber seals 211 are interposed at the adjacent side walls of the sump and preferably the rubber seals are secured to the inner sides of the sump and engage the opposite inside side walls 19 of the pontoons to allow the sump to move along the seals and prevent fluid from entering the upper area between the side walls of the sump and the inner sides of the pontoons. The seals may be in the form of rubber flanges which will be held in a sealing condition during operation by the pressure differential existing on opposite sides of the seals.

As best seen in FIG. 2A, each of the pontoons is also provided with a submersible pump 225. The inlet of pump 225 communicates with the interior chamber of the pontoons. The outlet of the pump has a vertically extending discharge pipe 228 terminating at a valve 230 on deck which may be connected to a suitable conduit or hose for off loading oil that may be temporarily stored within the pontoons.

The present invention will be better understood from the following description of operation.

The skimmer craft 10 of the present device can operate singularly as shown in FIG. 5 or, as shown in FIG. 6, two or more crafts can cooperate to make collection of oil spills more efficient. Generally the skimmer craft will operate with support vessels such as a tanker 200 to which the skimmed oil can be pumped. However, as pointed out above, the large pontoons each define an interior chamber 20 which may serve as a temporary storage tank for skimmed oil.

The pilot, by selectively controlling the propulsion units, can pilot the craft to the spill area. Generally for piloting purposes, only the two stern propulsion units 41, 42 would have to be operated. In some cases the bow units may be operated to transport the craft as in some conditions, particularly rough water, the bow units will tend to lower the bow of the craft and buffer oncoming waves. In extremely heavy seas, additional propulsion units may be required to pilot the craft to provide adequate control. Operation of the outboard propulsion units will serve to dampen wave action on the craft, making the craft more navigatable in rough water conditions.

Once the site of the oil spill is reached, the craft can be operated in a collection mode. The depth of the propulsion units is adjusted in a manner to accomplish several things. First of all, the propulsion units are operated to establish a surface and subsurface streamline flow pattern as shown in FIG. 5 which is at a depth corresponding to the flotation pool. The propulsion units along with a controlled forward motion of the skimmer craft will cause water and the attendent oil layer 90 to be directed in a streamline flow forwardly along the outer sides of the pontoons and be pulled inwardly between the pontoons as shown. The streamline flow at the sides of pontoons is preferably at an outboard location to avoid friction from the hull. Similarly, water ejected at the rear of the skimmer craft will be at least partially caused to return forwardly along the sides of the pontoons under the influence of the aft propulsion units. The water and oil layer enter centrally between the pontoons in the forward area defined as the flotation pool 100. The elevation of the floor plate 104 and the position of the sump 120 and weir are adjusted by the operator so that an oil layer 90 of desirable depth is established in the flotation pool. The oil and some water will be skimmed from the surface of the water at the weir and will enter into the sump chamber 125. A portion of the subsurface water will enter into the flotation pool area 100 and the remainder of the water will pass beneath the floor 104. The purpose of the design is to separate the surface water layer with its floating oil from the submarine stream which passes beneath the floor plate 104.

Roller 115 at the forward end of the floor is self-cleaning and will tend to free the floor of seaweed and other debris. The water in the lower portion of the flotation pool 100 at the rear of the pool will enter into the water channel 150 between the floor and the sump and be ejected at the rear of the sump adjacent the inlet to the rear propulsion units to rejoin the submarine flow.

Oil which is collected from the surface of the water enters the sump chamber 125 and establishes a reservoir of collected oil within the sump. The collected oil will enter into the comminutor unit 175, pass by the comminutor blade so that any clumps of agglomerated oil are broken up so and to be pumped under the influence of pump 142 either to the pontoon chamber 20 or directly off-loaded to a support tanker at valve 210.

The flotation pool 100 serves to trap the oil and the oil collects in the pool until the layer is thick enough to spill over into the sump without carrying excessive amounts of water into the sump. Water flow out of the flotation area is accomodated by the flow channel 105 beneath the sump. The hydraulic cylinders 106, 107 are operated to raise or lower the entire separator floor 100 to maintain a proper working position and relationship of the weir to the oil and water surface. Generally the submarine stream flow below the floor is faster than the surface stream flow and assists to help expel water through the water exit opening from the flotation pool and maintain the water flow through the flotation pool.

The dimensions of the skimmer craft may vary significantly. However, the dimensions, particularly of the flotation pool and the size of the water channel 150 should be selected and the unit should be operated to prevent whirlpooling of the water at the water exit and to keep oil from being carried through the water exit.

The boat propulsion units should also be selected in accordance with the size of the vehicle and serve to provide propulsion and steering for the unit and in the oil-collecting mode, serve to maintain a proper relationship with the water surface as the craft settles and rises due to the pontoons or hulls being filled or empty of salvaged oil. These units also provide the forced flow of the floating oil and the surface water into the separator unit. The up and down adjustment of these units allows the operator control that will best maintain the flow.

In operation, the bow propulsion units 45, 46 will push flow into the flotation pool and also direct a submarine flow beneath the plate 100. The stern propulsion units 41, 42 will push flow rearwardly. The propulsion units 43, 44 at the starboard and the units 47, 48 at the port side assist in circulating flow from the stern back to the bow. With the circulating flow as shown in FIG. 5, significant advantages are obtained as follows.

1. In thick oil conditions, the flow pattern will not overload the separator system as normal swathing procedure would.

2. With appropriate control of the power and the direction, the craft may move in any direction, forward, backwards, or sideways at a controlled speed that will not overload the separator system.

3. The wider swath may be pulled into the separator with each pass. That is, wider than the actual width of the craft itself.

4. The unit may be operated in a stationary position or a hovering position due to the control available because of the opposing location of the propulsion units. As for example, the craft could hover in a position offshore or adjacent an oil spill and utilize the controlled circulation to scour a pre-determined area and to pull oil to the craft itself.

5. The high capacity of the unit permits the oil to be quickly cleaned-up before more extensive damage can occur. With a large oil spill this high capacity would make it necessary for a support tanker to be present to permit continuous off-loading.

6. The maneuverability of the craft is adaptable to most all conditions that may be encountered such as configurations of harbor, wharfs, piers, anchored boats, and oil platforms.

By operating the craft off-shore with the bow pointed towards the shore with the circulation flow initiated as shown in FIG. 5 and by applying appropriate power, the craft may be caused to move sideways and parallel to the shore to progressively wash and sweep the full length of the beach or shoreline carrying away floating oil to the separator unit. Repeated washings of the beaches and shore would help float-off some of the oil sticking to the fixtures and features of the harbor to aid in the clean up.

In FIG. 6 two skimmers 10 and 10A are shown operating in a bow-to-bow orientation both moving laterally into an oil slick 250. A herder craft 260 is shown operating astern of skimmer 10 creating a flow pattern 265 from outboard propulsion units 270 within the zone of influence of the flow pattern about craft 10. Large areas can be efficiently covered in this manner. A support tanker 200 is available for containment of collected oil. Additional herder crafts 260A, 260B operating astern of craft 10A extend the flow pattern to cover a wider swath.

The twin pontoon hull design is also efficient and stable. The separator unit and all related equipment, controls, tanks, decking, pilot house and the like may be easily adapted to this design. The pontoons serve to provide flotation and storage of collected oil or to serve as additional fuel storage for non-stop operation.

It will be obvious to those skilled in the art to make various changes, alterations and modifications to the skimmer craft described above. To the extent that these changes, alterations and modifications do not depart from the spirit and scope of the appended claims, they are intended to be encompassed therein.

I claim:

1. A skimmer craft for removing a pollutant layer from the surface of a body of water comprising:
    (a) flotation means having a bow and stern and having a generally horizontal floor portion normally located below the water surface establishing a flotation pool above the floor and a submarine flow from bow to stern below the floor;
    (b) means defining a water exit channel below the water surface communicating with said flotation pool and discharging into the submarine flow;
    (c) a sump having a spill board located in said flotation pool, said spill board being located below the normal water surface to separate and direct at least a portion of the pollutant layer into the sump; and
    (d) propulsion means connected to said skimmer craft at the bow, port, starboard and stern, said propulsion means being outboard of said flotation means to establish a predetermined and controlled flow pattern, said bow propulsion means directing water into the flotation pool at the bow of the boat, said stern propulsion means directing water rearwardly from said exit channel and said port and starboard, propulsion means directing water forwardly along the side of the flotation means toward the bow of the skimmer craft.

2. The skimmer craft of claim 1 further including comminutor means associated with said sump and pump means communicating with said comminutor means.

3. The skimmer craft of claim 2 wherein said comminutor means comprises a generally cylindrical housing having auger means rotatively disposed in said housing.

4. The skimmer craft of claim 1 wherein said flotation means consists of spaced-apart generally parallel pontoon members.

5. The skimmer craft of claim 4 wherein a deck extends between said pontoon members.

6. The skimmer craft of claim 5 wherein said deck supports a wheel house and engine.

7. The skimmer craft of claim 4 wherein said pontoon includes storage chambers therein for reception of recovered oil.

8. The skimmer craft of claim 4 wherein said sump includes valve means for directing recovered oil from said sump selectively to said pontoons or to an off-loading location.

9. The skimmer craft of claim 1 wherein said propulsion units are adjustably mounted whereby the depth and position of the propulsion units about a vertical axis may be adjusted.

10. The skimmer craft of claim 1 wherein said propulsion units comprise propellers mounted in a housing being operatively driven by hydraulic motors.

11. The skimmer craft of claim 1 wherein said propulsion units comprise propellers mounted in a housing being operatively driven by hydraulic or electric motors.

12. The skimmer craft of claim 1 wherein said sump has a vertical front wall extending transversely within said flotation pool, a rear wall, opposite side walls and a bottom wall disposed above the floor of the flotation means defining the water exit channel therebetween.

13. The skimmer craft of claim 1 wherein said floor member has a self-cleaning roller means at the front edge thereof.

* * * * *